United States Patent
Ueda et al.

(10) Patent No.: US 7,026,073 B2
(45) Date of Patent: Apr. 11, 2006

(54) NON-AQUEOUS ELECTROLYTE SECONDARY BATTERY

(75) Inventors: Atsushi Ueda, Osaka (JP); Kazuya Iwamoto, Sakai (JP); Takafumi Oura, Hirakata (JP); Hiroshi Yoshizawa, Hirakata (JP); Masaki Deguchi, Neyagawa (JP); Takaharu Morikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 25 days.

(21) Appl. No.: 10/058,707

(22) Filed: Jan. 28, 2002

(65) Prior Publication Data

US 2002/0192565 A1 Dec. 19, 2002

(30) Foreign Application Priority Data

Jan. 29, 2001 (JP) .............................. 2001-019556
Dec. 20, 2001 (JP) .............................. 2001-386888

(51) Int. Cl.
*H01M 6/16* (2006.01)
(52) U.S. Cl. ...................... 429/326; 429/331; 429/332; 429/231.1
(58) Field of Classification Search ................ 429/338, 429/337, 331, 332, 330, 326, 324, 231.3, 429/231.8, 231.6, 231.1; 252/62.2
See application file for complete search history.

(56) References Cited

U.S. PATENT DOCUMENTS

| | | | | |
|---|---|---|---|---|
| 6,090,506 A | * | 7/2000 | Inoue et al. | 429/232 |
| 6,162,264 A | * | 12/2000 | Miyazaki et al. | 29/623.5 |
| 6,315,918 B1 | * | 11/2001 | Mita et al. | 252/62.2 |
| 6,723,473 B1 | * | 4/2004 | Oura et al. | 429/329 |
| 2001/0018152 A1 | * | 8/2001 | Kida et al. | 429/333 |
| 2002/0001756 A1 | * | 1/2002 | Hamamoto et al. | 429/324 |
| 2002/0064712 A1 | * | 5/2002 | Sekino et al. | 429/330 |
| 2003/0077517 A1 | * | 4/2003 | Nakanishi et al. | 429/324 |
| 2003/0118913 A1 | * | 6/2003 | Takami et al. | 429/337 |

FOREIGN PATENT DOCUMENTS

| | | | |
|---|---|---|---|
| EP | 0796510 | * | 4/1999 |
| JP | 08-096852 A | | 4/1996 |
| JP | 11-097062 | | 4/1999 |
| JP | 2000-235868 A | | 8/2000 |
| JP | 2001-023684 A | | 1/2001 |
| WO | WO 01/03228 | * | 1/2001 |

* cited by examiner

*Primary Examiner*—Raymond Alejandro
(74) *Attorney, Agent, or Firm*—Akin Gump Strauss Hauer & Feld, LLP

(57) ABSTRACT

In an electrolyte of a non-aqueous electrolyte secondary battery using a cyclic carboxylic-acid ester exerting high conductivity under a low temperature condition, for suppressing reductive decomposition of the cyclic carboxylic acid ester, a cyclic carbonic acid ester having at least one carbon-carbon unsaturated bond is contained, and for suppressing excessive polymerization reaction of the cyclic carbonic acid ester having at least one carbon-carbon unsaturated bond, a cyclic carbonic acid ester having no carbon-carbon unsaturated bond is further contained.

14 Claims, 1 Drawing Sheet

NON-AQUEOUS ELECTROLYTE SECONDARY BATTERY

BACKGROUND OF THE INVENTION

There has recently been a rapid advancement in realization of small, lightweight and cordless electronic appliances such as personal computers and portable telephones, leading to a high demand for secondary batteries having a high energy density as power sources for these appliances. Among them, a non-aqueous electrolyte secondary battery containing lithium as an active material has been expected greatly to be a battery having a high voltage and high energy density. This battery conventionally comprised a negative electrode using metal lithium and a positive electrode using molybdenum disulfide, manganese dioxide, vanadium pentoxide or the like, to be a 3V-level battery.

In the case that metal lithium is used for the negative electrode, however, there is a problem that dendritic lithium deposits on the electrode plate during charging and is accumulated thereon as the charging and discharging are repeated, the accumulated dendritic lithium being isolated, floating in the electrolyte and coming into contact with the positive electrode to incur a minor short. This results in a short cycle life as charge and discharge efficiency of the battery falls. And there is another problem in terms of safety since dendritic lithium has a large surface area and thus has the high reaction activity.

In order to solve these problems, vigorous studies have been done in recent years on a lithium-ion secondary battery in which a carbon material is used for the negative electrode in place of metal lithium, and a lithium-containing transition metal oxide having a 4V-level potential against lithium such as $LiCoO_2$, $LiNiO_2$ or $LiMn_2O_4$, is used for the positive electrode, the battery having already been commercialized. In this battery, lithium is in the state of being absorbed as ions in the carbon material in the negative electrode. This prevents the deposition of dendritic lithium, which was observed on the conventional negative electrode using metal lithium, and thus enables the battery to ensure extremely high reliability in safety.

As thus described, the characteristics of the positive electrode and the negative electrode are of importance in a non-aqueous electrolyte secondary battery, particularly in a lithium-ion secondary battery. And further, if satisfactory characteristics are to be obtained, the characteristic of a non-aqueous electrolyte transferring lithium ions is also of importance. A non-aqueous solvent composing this non-aqueous electrolyte is usually a combination of a solvent having a large dielectric constant which facilitates dissolution of a solute and a solvent having low viscosity.

The reason for the combination is as follows:

The solvent having a large dielectric constant has high viscosity and thus transfers ions very slowly. Then a solvent having low viscosity is also used so-as to enhance capability of transferring ions. For example, a cyclic carbonic acid ester, which is the solvent having a large dielectric constant, such as ethylene carbonate, and a linear carbonic acid ester, which is the solvent having low viscosity, such as dimethyl carbonate, diethyl carbonate or ethylmethyl carbonate are mixed to obtain an electrolyte having high conductivity, which has hitherto been in general use. Because ethylene carbonate has a solidifying point of as high as around 38° C., when it is singly used, the solidifying point may go down to around 0° C. at the lowest even with the consideration of the freezing point depression due to the solute dissolved therein. As described above, therefore, ethylene carbonate is mixed with the solvent having low viscosity as well as a low solidifying point to ensure low temperature characteristics. Under the present circumstances, however, even the mixed solvent cannot ensure sufficient low temperature characteristics since no small effect of ethylene carbonate on the low temperature characteristics remains.

Thereupon, an electrolyte using a lactone-type solvent, which is a cyclic carboxylic acid ester, has been proposed (in Japanese Laid-Open Patent Publication No. Hei 11-097062). This is a very preferable solvent for the lithium-ion secondary battery as having a solidifying point of as low as −45° C. while having a large dielectric constant.

However, γ-butyrolactone, one of lactone-type solvents, has a drawback of being prone to reductively decomposed on the negative electrode, which leads to generation of a large amount of decomposition gas in the battery. In order to suppress the reductive decomposition of γ-butyrolactone on the negative electrode, a battery has been studied in which vinylene carbonate, known as an additive to form a film on a negative electrode, is added to an electrolyte containing γ-butyrolactone. But this battery exhibits significant deterioration in charge and discharge characteristics when exposed to a high temperature over a period of time. This is presumably because the decomposition of vinylene carbonate on the negative electrode is accelerated by heat to form an excessive film on the negative electrode. That is, the excessive film inhibits the smooth intercalation and deintercalation of lithium ions into and from the negative electrode, resulting in significant deterioration of charge and discharge characteristics of the battery after exposure of the battery to a high temperature over a period of time.

BRIEF SUMMARY OF THE INVENTION

The present invention is to provide a non-aqueous electrolyte secondary battery in which the above-mentioned problems are solved, having excellent charge and discharge characteristics, particularly at a low temperature, and showing satisfactory charge and discharge characteristics even after being exposed to a high temperature over a period of time.

As trying to solve the above-mentioned problems, the inventors of the present invention diligently studied, to find that by making a cyclic carbonic acid ester having no carbon-carbon unsaturated bond (C) contained in an electrolyte comprising a cyclic carboxylic acid ester (A) represented by a lactone-type solvent and a cyclic carbonic acid ester having at least one carbon-carbon unsaturated bond (B), obtained is a non-aqueous electrolyte having excellent charge and discharge characteristics at a low temperature and exerting satisfactory charge and discharge characteristics even after the battery is exposed to a high temperature over a period of time.

The following are the reasons for the excellent battery characteristics of the above-mentioned non-aqueous electrolyte:

The cyclic carbonic acid ester having at lest one carbon-carbon unsaturated bond (B) occurs a chain reaction on the negative electrode, as the unsaturated bond part is prone to be polymerized, and rapidly forms a close and strong film. This film serves as a physical barrier inhibiting contact of solvent molecules around lithium ions with the negative electrode, suppressing the reductive decomposition of the cyclic carboxylic acid ester on the negative electrode.

However, in the case that a battery, produced using the electrolyte comprising a cyclic carboxylic acid ester (A) and a cyclic carbonic acid ester having a carbon-carbon unsaturated bond (B), is exposed to a high temperature over a period of time, the decomposition of the cyclic carbonic acid ester having at least one carbon-carbon unsaturated bond (B) on the negative electrode is accelerated by heat, as described above, forming an excessive film on the negative electrode. As a result, lithium ions are not smoothly intercalated into and deintercalated from the negative electrode, thereby raising a problem that the charge and discharge characteristics of the battery are significantly deteriorated.

Further containment of the cyclic carbonic acid ester having no carbon-carbon unsaturated bond (c) in the electrolyte then allows suppression of the excessive polymerization of the cyclic carbonic acid ester having at least one carbon-carbon unsaturated bond (B) under a high temperature condition. A cyclic carbonic acid ester having no carbon-carbon unsaturated bond (c) such as ethylene carbonate or propylene carbonate is also reductively decomposed and forms a film derived from the decomposed product on the negative electrode, like a cyclic carbonic acid ester having a carbon-carbon unsaturated bond (B) such as vinylene carbonate. However, the formation of the film by ethylene carbonate or propylene carbonate is much slower than vinylene carbonate or the like, since ethylene carbonate and propylene carbonate have no carbon-carbon unsaturated bond.

In the case that ethylene carbonate or propylene carbonate is bonded to the intermediate produced by the polymerization of vinylene carbonate in the halfway through the chain reaction of vinylene carbonate, the reactivity of the part bonded with ethylene carbonate or propylene carbonate becomes very low at the end of the intemediate, which suppresses the excessive polymerization of vinylene carbonate under a high temperature condition. This results in realization of a battery having satisfactory charge and discharge characteristics even after exposure of the battery to a high temperature over a period of time.

The present invention relates to a non-aqueous electrolyte secondary battery comprising a positive electrode, a negative electrode and a non-aqueous electrolyte, wherein the non-aqueous electrolyte comprises a non-aqueous solvent and a solute dissolved in the non-aqueous solvent, and the non-aqueous solvent comprises (A) a cyclic carboxylic acid ester, (B) a cyclic carbonic acid ester having at least one carbon-carbon unsaturated bond and (C) a cyclic carbonic acid ester having no carbon-carbon unsaturated bond.

It is preferable that the cyclic carboxylic acid ester (A) is at least one selected from the group consisting of γ-butyrolactone and a derivative of γ-butyrolactone represented by the formula (1):

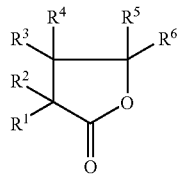

where $R^1$ to $R^6$ are, independently, a hydrogen atom, a halogen atom, an alkyl group having 1 to 6 carbon atoms, or an acetyl group having 1 to 6 carbon atoms.

It is preferable that the derivative of γ-butyrolactone is γ-valerolactone.

It is preferable that the cyclic carbonic acid ester having at least one carbon-carbon unsaturated bond (B) is at least one selected from the group consisting of vinylene carbonate, vinylethylene carbonate and divinylethylene carbonate.

It is preferable that the cyclic carbonic acid ester having no carbon-carbon unsaturated bond (C) is at least one selected from the group consisting of propylene carbonate, ethylene carbonate and butylene carbonate.

It is preferable that the cyclic carboxylic acid ester (A) is at least one selected from the group consisting of γ-butyrolactone and γ-valerolactone, the cyclic carbonic acid ester having at least one carbon-carbon unsaturated bond (B) is at least one selected from the group consisting of vinylene carbonate, vinylethylene carbonate and divinylethylene carbonate, and the cyclic carbonic acid ester having no carbon-carbon unsaturated bond (C) is at least one selected from the group consisting of propylene carbonate and ethylene carbonate.

It is also preferable that for the cyclic carbonic acid ester having at least one carbon-carbon unsaturated bond (B), both vinylene carbonate and vinylethylene carbonate are used.

The above-mentioned non-aqueous solvent can further comprise a linear carbonic acid ester (D).

It is preferable that the linear carbonic acid ester (D) is at least one selected from the group consisting of dimethyl carbonate, ethylmethyl carbonate and diethyl carbonate.

The above-mentioned non-aqueous solvent can further comprise a glime (E).

It is preferable that the glime (E) is at least one selected from the group consisting of diglime, triglime and tetraglime.

In the non-aqueous electrolyte secondary battery of the present invention, it is preferable that the positive electrode comprises a lithium-containing transition metal oxide and the negative electrode comprises graphite.

It is preferable that the lithium-containing transition metal oxide is represented by the formula:

$$Li_a(Co_{1-x-y}Mg_xM_y)_bO_c$$

where M is at least one selected from the group consisting of Mn, Ni, Y, Yb, Ca, Al, Ti, Cu, Zn, Sr and Ba, $0 \leq a \leq 1.05$, $0.005 \leq x \leq 0.15$, $0 \leq y \leq 0.25$, $0.85 \leq b \leq 1.1$ and $1.8 \leq c \leq 2.1$.

It is preferable that for the solute, both $LiPF_6$ and $LiBF_4$ are used.

The above-mentioned non-aqueous solvent can further comprise a derivative of benzene comprising a phenyl group and a cyclic compound group contiguous to the phenyl group.

It is preferable that the derivative of benzene is at least one selected from the group consisting of cyclohexylbenzene, biphenyl, derivatives of benzene having a lactone group and diphenyl eter.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
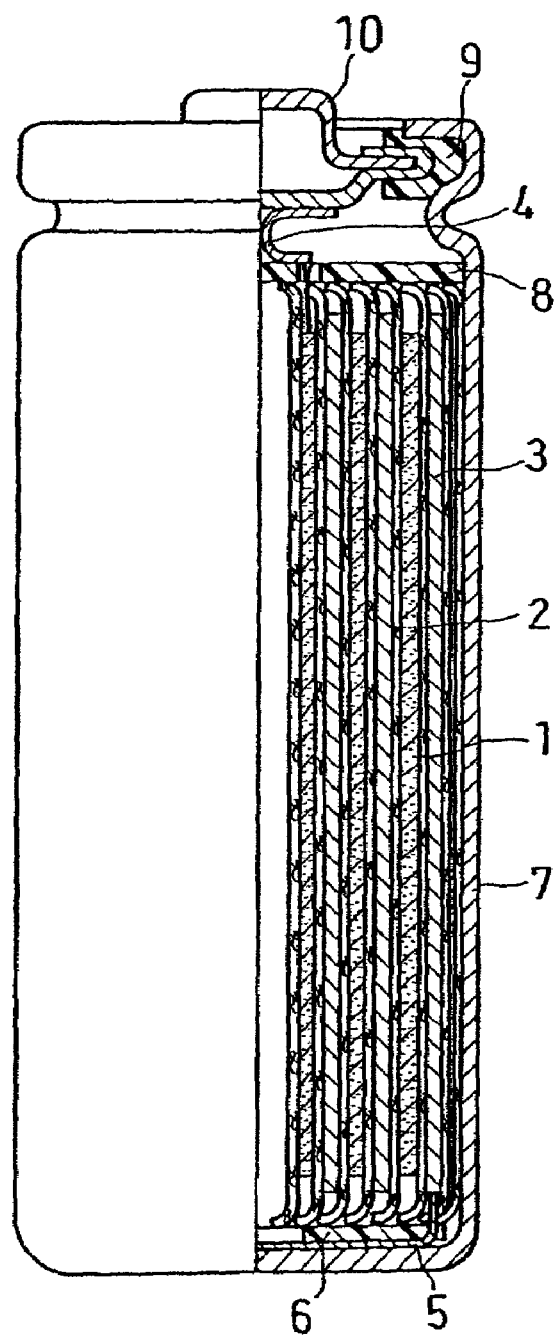
FIG. 1 is a front view of the cylindrical lithium-ion secondary battery used in the examples of the present invention, showing a vertical sectional view in the right-half portion.

The present invention relates to a non-aqueous electrolyte secondary battery. More specifically; the present invention relates to improvement in a solvent of a non-aqueous electrolyte, aimed particularly at improving charge and discharge characteristics under a low temperature condition of a non-aqueous electrolyte secondary battery.

The non-aqueous electrolyte secondary battery in accordance with the present invention comprises therein the non-aqueous electrolyte comprising a non-aqueous solvent and a solute, where the non-aqueous solvent comprises a cyclic carboxylic acid ester (A) having a large dielectric constant and capability of transferring ions, a cyclic carbonic acid ester having at least one carbon-carbon unsaturated bond (B) and a cyclic carbonic acid ester having no carbon-carbon unsaturated bond (C).

The exemplary cyclic carboxylic acid esters (A) may include γ-butyrolactone (GBL), γ-valerolactone (GVL), α-acetyl-γ-butyrolactone, α-methyl-γ-butyrolactone, β-methyl-γ-butyrolactone, α-angelica lactone, α-methylene-γ-butyrolactone, γ-hexanolactone, γ-nonanolactone, γ-octanolactone and γ-methyl-γ-decanolactone. They may be used singly or in combination of two or more of them.

The exemplary cyclic carbonic acid esters having at least one carbon-carbon unsaturated bond (B) may include vinylene carbonate (VC):

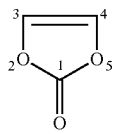

as well as 3-methylvinylene carbonate, 3,4-dimethylvinylene carbonate, 3-ethylvinylene carbonate, 3,4-diethylvinylene carbonate, 3-propylvinylene carbonate, 3,4-dipropylvinylene carbonate, 3-phenylvinylene carbonate, 3,4-diphenylvinylene carbonate, vinylethylene carbonate (VEC) and divinylethylene carbonate (DVEC). They may be used singly or in combination of two or more of them. One or more of hydrogen atoms of these compounds may be replaced with fluorine atoms. The use of both vinylene carbonate and vinylethylene carbonate is particularly preferred as vinylethylene carbonate suppresses the reaction activity of vinylene carbonate at a high temperature to improve storage characteristics of the battery at a high temperature.

The exemplary cyclic carbonic acid esters having no carbon-carbon unsaturated bond (C) may include propylene carbonate (PC), ethylene carbonate (EC) and butylene carbonate (BC). They may be used singly or in combination of two or more of them. One or more of hydrogen atoms of these compounds may be replaced with fluorine atoms.

The content of the cyclic carboxylic acid ester (A) is preferably from not less than 10% to not more than 97% by volume in the total volume of the non-aqueous solvent.

The content of the cyclic carbonic acid ester having at least one carbon-carbon unsaturated bond (B) is preferably from not less than 0.5% to not more than 20% by volume in the total volume of the non-aqueous solvent.

The content of the cyclic carbonic acid ester having no carbon-carbon unsaturated bond (C) is preferably 40% by volume or less, more preferably from not less than 0.1% to not more than 30% by volume, and most preferably from not less than 0.1% to not more than 20% by volume in the total volume of the non-aqueous solvent.

The non-aqueous solvent can further comprise a linear carbonic acid ester (D). When the linear carbonic acid ester (D) is contained in the non-aqueous solvent, the viscosity of the non-aqueous electrolyte is lowered, enabling further improvement in the charge and discharge characteristics at a low temperature.

The exemplary linear carbonic acid esters (D) may include dimethyl carbonate (DMC), ethylmethyl carbonate (EMC) and diethyl carbonate (DEC). They may be used singly or in combination of two or more of them.

The content of the linear carbonic acid ester (D) is preferably 50% by volume or less, more preferably from not less than 0.1% to not more than 30% by volume, and most preferably from not less than 0.1% to not more than 20% by volume in the total volume of the non-aqueous solvent.

The non-aqueous solvent can further comprise a glime (E). The exemplary glimes (E) may include diglime, triglime and tetraglime. They may be used singly or in combination of two or more of them.

The content of the glime (E) is preferably 20% by volume or less in the total volume of the non-aqueous solvent.

Moreover, it is effective to add a derivative of benzene (F), conventionally well known for being decomposed in overcharging to form a film on the electrode and make the battery inert, to the non-aqueous solvent in accordance with the present invention.

It is preferable to use at least one derivative of benzene (F) comprising a phenyl group and a cyclic compound group contiguous to the phenyl group.

The cyclic compound is preferably a phenyl group, cycloether group, cycloester group, cycloalkyl group, phenoxy group or the like.

The exemplary derivatives of benzene (F) include cyclohexyl benzene, biphenyl, a derivative having a lactone group, diphenyl eter and the like. They may be used singly or in combination of two or more of them. The content of the derivative of benzene (F) is 10% by volume or less in the total volume of the non-aqueous solvent.

The solute dissolved in the non-aqueous solvent is not particularly limited in the present invention, and any one of conventional solutes used for non-aqueous electrolyte secondary batteries can be applied. To be specific, used may be $LiClO_4$, $LiAsF_6$, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiB[C_6F_3\text{-}(CF_3)_2\text{-}3,5]_4$, $LiPF_a(C_bF_{2b+1})_{6-a}$ where a is an integer of 1 to 5 and b is an integer not smaller than 1, $LiPF_c(C_dF_{2d+1}SO_2)_{6-c}$ where c is an integer of 1 to 5 and d is an integer not smaller than 1, $LiBF_e(C_fF_{2f+1})_{4-e}$ where e is an integer of 1 to 3 and f is an integer not smaller than 1, $LiBF_g(C_hF_{2h+1}SO_2)_{4-g}$ where g is an integer of 1 to 3 and h is an integer not smaller than 1. They may be used singly or in combination of two or more of them.

Among them, the use of both $LiPF_6$ and $LiBF_4$ is particularly preferred. $LiPF_6$ is excellent in electrical characteristics but chemically unstable as it produces hydrofluoric acid. The cyclic carboxylic acid ester (A) composing the electrolyte in accordance with the present invention, in particular, is prone to be decomposed by hydrofluoric acid, thereby, for example, possibly deteriorating cycle characteristics of the battery.

Likewise, in the case that only $LiBF_4$ is used, cycle characteristics of the battery is deteriorated because the degree of electrolytic dissociation of $LiBF_4$ is small or the film formed on the surface of the negative electrode comprising graphite is weak.

On the other hand, the use of both $LiPF_6$ and $LiBF_4$ improves cycle characteristics of the battery. Although this effect brought about by adding $LiBF_4$ can be obtained even when the amount thereof is small, the preferable content of $LiBF_4$ is 10% by mole or more of the total amount of the solute. The preferable content of $LiPF_6$ is 2% by mole or more of the total amount of the solute.

The concentration of the solute in the non-aqueous electrolyte is preferably from not less than 0.8 mol/l to not more than 2.5 mol/l.

To the positive electrode and the positive electrode of the battery for which the above-mentioned non-aqueous electrolyte is used, one normally used for this kind of non-aqueous electrolyte secondary battery can be applied.

The preferable positive electrode material is one mainly comprising a composite oxide containing lithium and one or more of transition metals, i.e. a lithium-containing transition metal oxide, from the aspect of increasing a battery capacity and energy density. For example, suitable is an active material mainly comprising the lithium-containing transition metal oxide represented by the formula $Li_xMO_2$ where M represents one or more of transition metals, x varies depending on the charged or discharged state of a battery, and normally $0.05 \leq x \leq 1.10$. In this $Li_xMO_2$, the transition metal M is preferably at least one of Co, Ni and Mn. $Li_xMn_2O_4$ may also be used as the lithium-containing transition metal oxide.

For the positive electrode material, in particular, a lithium-containing transition metal oxide represented by $Li_a(Co_{1-x-y}Mg_xM_y)_bO_c$ where M is at least one selected from the group consisting of Mn, Ni, Y, Yb, Ca, Al, Ti, Cu, Zn, Sr and Ba, $0 \leq a \leq 1.05$, $0.005 \leq x \leq 0.15$, $0 \leq y \leq 0.25$, $0.85 \leq b \leq 1.1$ and $1.8 \leq c \leq 2.1$, is preferably used in terms of improving electron conductivity of the active material. However, the use of the conventional electrolyte mainly comprising the cyclic carbonic acid ester and the linear carbonic acid ester combined with $Li_a(Co_{1-x-y}Mg_xM_y)_bO_c$ has a drawback that the non-aqueous solvent and the active material are readily reacted with each other because the reactivity of active material is increased. On the contrary, the use of the electrolyte in accordance with the present invention improves the cycle characteristics of the battery. The reason for this is unclear, but it is presumably because a stable film is formed on the surface of the positive electrode as well which suppresses the decomposition of the electrolyte.

The above-mentioned lithium-containing transition metal oxide $Li_a(Co_{1-x-y}Mg_xM_y)_bO_c$ can be obtained by calcinating a lithium salt, a magnesium salt, a salt of metal M and a cobalt salt under an oxidation atmosphere at a high temperature. The following materials may be used for synthesizing the positive electrode active material:

As the lithium salt, lithium carbonate, lithium hydroxide, lithium nitrate, lithium sulfate, lithium oxide or the like may be used.

As the magnesium salt, magnesium oxide, basic magnesium carbonate, magnesium chloride, magnesium fluoride, magnesium nitrate, magnesium sulfate, magnesium acetate, magnesium oxalate, magnesium sulfide, magnesium hydroxide or the like may be used.

Similarly, as the salt of metal M, conventionally available ones may be suitably used.

As the cobalt salt, cobalt oxide, cobalt hydroxide or the like may be used.

The lithium-containing transition metal oxide can also be obtained by a co-precipitation method including synthesizing cobalt hydroxide containing Mg and a metal element M, mixing the cobalt hydroxide with a lithium salt and calcinating the resultant mixture.

To a negative electrode material, metal lithium and a material capable of intercalating and deintercalating lithium may be applied. The exemplary materials capable of intercalating and deintercalating lithium may include: carbon material such as a thermally decomposed carbon, cokes (pitch coke, needle coke and oil coke), graphite, a glassy carbon, a calcined matter of an organic polymer compound obtained by calcinating a phenol resin, a furane resin or the like at an arbitrary temperature and carbonizing it, a carbon fiber and an activated carbon; polymers such as polyacetylene, polypyrrole and polyacene; a lithium-containing transition metal oxide such as $Li_{4/3}Ti_{5/3}O_4$; and a transition metal sulfide such as $TiS_2$. The carbon material is particularly suitable among them, and, for example, when graphite having a structure in which the spacing between (002) lattice planes is 0.340 nm or less is used, the energy density of the battery is improved.

The positive electrode material as thus described is kneaded with, for example, a binder and a conductive agent to be processed into the electrode plate. And the negative electrode material is kneaded with, for example, a binder to be processed into the electrode plate. As the binder and conductive agent to be kneaded, any of conventionally used ones can be applied.

The shapes applicable for the battery including large types in accordance with the present invention are cylindrical, square, coin, button, and the like. The forms of the positive electrode and the negative electrode may be changed depending on the applied shape of the battery.

The examples of the present invention will be described as follows with reference to the drawings:

EXAMPLE 1

FIG. 1 shows a front view of a cylindrical non-aqueous electrolyte secondary battery having a diameter of 18 mm and a height of 65 mm, showing a vertical sectional view in the right-half portion. This battery was produced in the example in the following manner:

Via a separator 1, a band-like positive electrode plate 2 and a negative electrode plate 3 were spirally rolled up to form an electrode plate assembly. A positive electrode lead plate 4 made of aluminum and a negative electrode lead plate 5 made of nickel were respectively welded to the positive electrode plate 2 and the negative electrode plate 3. A lower insulating plate 6 made of a polyethylene resin was fixed on the bottom of the electrode plate assembly, which was accommodated in a battery case 7 made of iron with the inner surface thereof nickel-plated, and the other end of the negative electrode lead plate 5 was spot-welded to the inner bottom surface of the battery case 7. After an upper insulating plate 8 made of a polyethylene resin was mounted on the upper surface of the electrode plate assembly, a groove was provided in a given position close to the opening of the battery case 7, and a given amount of the non-aqueous electrolyte was poured into the battery case 7 and immersed in the electrode plate assembly. A sealing plate 10 made of stainless steel, provided with a gasket 9 made of a polypropylene resin in the circumference thereof, was prepared. The other end of the positive electrode lead plate 4 was spot-welded to the lower surface of the sealing plate 10, which was subsequently fixed to the opening of the battery case 7 via the gasket 9, and the opening edge of the battery case 7 was crimped to the gasket 9 to complete the battery.

The positive electrode plate 2 was produced in the following manner:

$Li_2CO_3$ and $Co_3O_4$ were mixed and the mixture was calcinated at 900° C. for 10 hours to synthesize $LiCoO_2$. 3 parts by weight of acetylene black as a conductive agent, 7 parts by weight of polytetrafluoroethylene as a binder, and 100 parts by weight of an aqueous solution containing 1 wt % of carboxymethyl cellulose were mixed with 100 parts by weight of $LiCoO_2$. The resultant mixture was then stirred to be mixed so as to give a positive electrode material mixture paste. The obtained positive electrode material mixture paste was applied onto both surfaces of an aluminum foil having a thickness of 30 μm serving as a current collector, dried and rolled by pressure with a roller, and which was then cut into a predetermined size to give a positive electrode plate 2.

The band-like positive electrode 2 and negative electrode 3 as thus produced, and a separator 1 of a microporous film made of a polyethylene resin having a thickness of 25 μm were used to form the above-mentioned electrode plate assembly.

The respective non-aqueous electrolytes, the compositions of which were shown in Table 1, were used to produce the batteries 1A to 22A of Example 1 of the present invention. In Table 1, the volume ratio of ethylmethyl carbonate and γ-butyrolactone (EMC/GBL) for the batteries 5A to 8A was 1:1, and the volume ratio of dimethyl carbonate and γ-butyrolactone (DMC/GBL) for the batteries 9A to 12A was 1:1. In the non-aqueous solvent of the batteries 1A to 22A of this example, 2% by volume of vinylene carbonate (VC) and 1% by volume of propylene carbonate (PC) or ethylene carbonate (EC) were contained. The concentration of the solute in the respective electrolytes was 1.25 mol/l.

TABLE 1

| Battery | Cyclic carboxylic acid ester (A) | Cyclic carbonic acid ester (B) | Cyclic carbonic acid ester (C) | Linear carbonic acid ester (D) | Solute | Solute concentration (mol/l) |
|---|---|---|---|---|---|---|
| 1A | GBL 97 Vol % | VC 2 vol % | PC 1 Vol % | — | $LiPF_6$ | 1.25 |
| 2A | GBL 97 Vol % | VC 2 vol % | PC 1 Vol % | — | $LiBF_4$ | 1.25 |
| 3A | GBL 97 Vol % | VC 2 vol % | EC 1 Vol % | — | $LiPF_6$ | 1.25 |
| 4A | GBL 97 Vol % | VC 2 vol % | EC 1 Vol % | — | $LiBF_4$ | 1.25 |
| 5A | GBL 48.5 Vol % | VC 2 vol % | PC 1 Vol % | EMC 48.5 Vol % | $LiPF_6$ | 1.25 |
| 6A | GBL 48.5 Vol % | VC 2 vol % | PC 1 Vol % | EMC 48.5 Vol % | $LiBF_4$ | 1.25 |
| 7A | GBL 48.5 Vol % | VC 2 vol % | EC 1 Vol % | EMC 48.5 Vol % | $LiPF_6$ | 1.25 |
| 8A | GBL 48.5 Vol % | VC 2 vol % | EC 1 Vol % | EMC 48.5 Vol % | $LiBF_4$ | 1.25 |
| 9A | GBL 48.5 Vol % | VC 2 vol % | PC 1 Vol % | DMC 48.5 Vol % | $LiPF_6$ | 1.25 |
| 10A | GBL 48.5 Vol % | VC 2 vol % | PC 1 Vol % | DMC 48.5 Vol % | $LiBF_4$ | 1.25 |
| 11A | GBL 48.5 Vol % | VC 2 vol % | EC 1 Vol % | DMC 48.5 Vol % | $LiPF_6$ | 1.25 |
| 12A | GBL 48.5 Vol % | VC 2 vol % | EC 1 Vol % | DMC 48.5 Vol % | $LiBF_4$ | 1.25 |
| 13A | γ-valerolactone 97 Vol % | VC 2 vol % | PC 1 Vol % | — | $LiBF_4$ | 1.25 |
| 14A | α·acetyl-γ-butyrolactone 97 Vol % | VC 2 vol % | PC 1 Vol % | — | $LiBF_4$ | 1.25 |
| 15A | α-methyl-γ-butyrolactone 97 Vol % | VC 2 vol % | PC 1 Vol % | — | $LiBF_4$ | 1.25 |
| 16A | β-methyl-γ-butyrolactone 97 Vol % | VC 2 vol % | PC 1 Vol % | — | $LiBF_4$ | 1.25 |
| 17A | α-angelica lactone 97 Vol % | VC 2 vol % | PC 1 Vol % | — | $LiBF_4$ | 1.25 |
| 18A | α-methylene-γ-butyrolactone | VC 2 vol % | PC 1 Vol % | — | $LiBF_4$ | 1.25 |
| 19A | γ-hexanolactone 97 Vol % | VC 2 vol % | PC 1 Vol % | — | $LiBF_4$ | 1.25 |
| 20A | γ-nonanolactone 97 Vol % | VC 2 vol % | PC 1 Vol % | — | $LiBF_4$ | 1.25 |
| 21A | γ-octanolactone 97 Vol % | VC 2 vol % | PC 1 Vol % | — | $LiBF_4$ | 1.25 |
| 22A | γ-methyl-γ-decanolactone 97 Vol % | VC 2 vol % | PC 1 Vol % | — | $LiBF_4$ | 1.25 |

The negative electrode plate 3 was produced in the following manner:

100 parts by weight of flake graphite pulverized and classified to have an mean particle size of about 20 μm, and 3 parts by weight of styrene-butadiene rubber as a binder were mixed, and the mixture was further added with 100 parts by weight of an aqueous solution containing 1 wt % of carboxymethyl cellulose. The resultant mixture was then stirred to be mixed so as to give a negative electrode material mixture paste. The obtained negative electrode material mixture paste was applied onto both surfaces of a copper foil having a thickness of 20 μm serving as a current collector, dried and rolled by pressure with a roller, which was then cut into a predetermined size to give a negative electrode plate 3.

COMPARATIVE EXAMPLE 1

Comparative batteries 1B to 12B were produced in the same manner as in Example 1, except that the respective non-aqueous electrolytes, the compositions of which were shown in Table 2, were used.

In Table 2, the volume ratio of ethylene carbonate and ethylmethyl carbonate (EC/EMC) for the comparative batteries 3B and 4B was 1:3. In the non-aqueous solvent of the comparative batteries 7B and 8B, 2% by volume of vinylene carbonate (VC) was contained. In the non-aqueous solvent of the comparative batteries 9B to 12B, 1% by volume of propylene carbonate (PC) or ethylene carbonate (EC) was contained. The concentration of the solute in the respective electrolytes was 1.25 mol/l.

TABLE 2

| Battery | Cyclic carboxylic acid ester (A) | Cyclic carbonic acid ester (B) | Cyclic carbonic acid ester (C) | Linear carbonic acid ester (D) | Solute | Solute concentration (mol/l) |
|---|---|---|---|---|---|---|
| 1B | — | — | EC 100 Vol % | — | $LiPF_6$ | 1.25 |
| 2B | — | — | EC 100 Vol % | — | $LiBF_4$ | 1.25 |
| 3B | — | — | EC 25 Vol % | EMC 75 Vol % | $LiPF_6$ | 1.25 |
| 4B | — | — | EC 25 Vol % | EMC 75 Vol % | $LiBF_4$ | 1.25 |
| 5B | GBL 100 Vol % | — | — | — | $LiPF_6$ | 1.25 |
| 6B | GBL 100 Vol % | — | — | — | $LiBF_4$ | 1.25 |
| 7B | GBL 98 Vol % | VC 2 Vol % | — | — | $LiPF_6$ | 1.25 |
| 8B | GBL 98 Vol % | VC 2 Vol % | — | — | $LiBF_4$ | 1.25 |
| 9B | GBL 99 Vol % | — | EC 1 Vol % | — | $LiPF_6$ | 1.25 |
| 10B | GBL 99 Vol % | — | EC 1 Vol % | — | $LiBF_4$ | 1.25 |
| 11B | GBL 99 Vol % | — | PC 1 Vol % | — | $LiPF_6$ | 1.25 |
| 12B | GBL 99 Vol % | — | PC 1 Vol % | — | $LiBF_4$ | 1.25 |

Evaluation of Batteries Part 1

(i) Amount of Gas:

The batteries 1A to 22A of Example 1 and the batteries 1B to 12B of Comparative Example 1 were charged and discharged at a constant current of 300 mA at an ambient temperature of 20° C., with the final voltage for the charging of 4.1 V and the final voltage for the discharging of 3.0 V. The above charge and discharge cycle was repeated 3 times. Then, the amount of gas generated in the batteries after 3 cycles were measured. The results were shown in Table 3.

(ii) Capacity Maintenance Rate Under a Low Temperature Condition:

The charge characteristics of the batteries under a low temperature condition were compared. The batteries were charged at a constant current and voltage in the test condition that a fixed ambient temperature was 20° C., a fixed ceiling voltage was 4.2 V, a maximum current was 1050 mA and the charging lasted 2.5 hours. The batteries thus charged were subsequently discharged at a discharge current of 1500 mA at ambient temperatures of 20° C. or −20° C. until the voltage reached 3.0 V. A rate of the discharge capacity measured at −20° C. to the discharge capacity measured at 20° C. in each battery was calculated by percentage (%), and it was taken as a capacity maintenance rate under a low temperature condition. The results were shown in Table 3.

(iii) Capacity Maintenance Rate After Storage at a High Temperature:

After the batteries in the charged state were stood still at a temperature of 85° C. for 72 hours, the discharge characteristics of the batteries were compared. In this test, the batteries were charged at a constant current and voltage in the test condition that a fixed ambient temperature was 20° C., a fixed ceiling voltage was 4.2 V, a maximum current was 1050 mA and the charging lasted 2.5 hours. The batteries thus charged were subsequently discharged at a discharge current of 1500 mV at an ambient temperature of 20° C. until the voltage reached 3.0 V. The discharge capacity of the batteries at 20° C. were measured before and after the batteries were stood still at 85° C., and in each battery a rate of the discharge capacity after the battery was stood still to that before the battery was stood still was calculated by percentage (%), and it was taken as a capacity maintenance rate after storage at a high temperature. The results were shown in Table 3.

TABLE 3

| Battery | Gas amount (ml) | Capacity maintenance rate under a low temperature condition (%) | Capacity maintenance rate after storage at a high temperature (%) |
|---|---|---|---|
| 1A | 1.2 | 75 | 87 |
| 2A | 1.3 | 73 | 84 |
| 3A | 1.1 | 71 | 85 |
| 4A | 1.3 | 70 | 85 |
| 5A | 1.5 | 78 | 89 |
| 6A | 1.6 | 76 | 87 |
| 7A | 1.6 | 78 | 86 |
| 8A | 1.7 | 76 | 86 |
| 9A | 1.9 | 80 | 89 |
| 10A | 1.8 | 79 | 88 |
| 11A | 1.9 | 78 | 89 |
| 12A | 1.7 | 72 | 88 |
| 13A | 1.6 | 73 | 83 |
| 14A | 1.4 | 70 | 82 |
| 15A | 1.7 | 73 | 84 |
| 16A | 1.4 | 71 | 80 |
| 17A | 1.3 | 74 | 81 |
| 18A | 1.8 | 72 | 82 |
| 19A | 1.5 | 75 | 82 |
| 20A | 1.3 | 71 | 83 |
| 21A | 1.7 | 73 | 81 |
| 22A | 1.4 | 72 | 80 |
| 1B | 1.6 | Electrolyte froze | 65 |
| 2B | 1.7 | Electrolyte froze | 60 |
| 3B | 3.8 | 35 | 79 |
| 4B | 3.9 | 32 | 67 |
| 5B | 21.0 | 25 | 5 |
| 6B | 28.0 | 22 | 5 |
| 7B | 1.8 | 72 | 34 |
| 8B | 1.9 | 70 | 35 |
| 9B | 16.0 | 31 | 7 |
| 10B | 18.0 | 30 | 7 |
| 11B | 19.0 | 19 | 4 |
| 12B | 17.0 | 16 | 5 |

As shown in Table 3, in the comparative batteries 5B and 6B, a great amount of decomposition gas was observed as a result of decomposition of GBL on the negative electrode. Also in the comparative batteries 9B to 12B, a great amount of decomposition gas was observed, indicating that PC or EC formed a film on the negative electrode so slowly that the film did not sufficiently suppress the decomposition of GBL. In the batteries 1A to 22A of Example 1 of the present invention, in comparison, it is considered that VC so rapidly decomposed and formed a film derived from a decomposed product on the negative electrode that it sufficiently suppressed the decomposition of GBL and a lactone-type solvent, greatly decreasing the amount of decomposition gas.

The comparative batteries 1B and 2B were totally unable to be discharged at −20° C. since EC froze at the low temperature. Also in the comparative batteries 3 and 4 where EC and EMC were contained, the capacity maintenance rate under a low temperature condition was as low as 35%, although the electrolyte did not freeze at −20° C. On the other hand, the batteries 1A to 22A of Example 1 had highly excellent capacity maintenance rates under a low temperature condition, attributed to the very low solidifying points of GBL and the lactone-type solvent.

When the comparative batteries 7B and 8B were exposed to a high temperature over a period of time, the polymerization reaction of VC was accelerated on the negative electrode to form an excessive film, which presumably prevented smooth intercalation and deintercalation of lithium ions into and from the negative electrode, causing a very low capacity maintenance rate after storage at a high temperature. The batteries 1A to 4A and 13A to 22A of Example 1, in comparison, had highly excellent capacity maintenance rates after storage at a high temperature since EC or PC suppressed the polymerization reaction of VC at a high temperature condition. Furthermore, it was found that containment of a linear carbonic acid ester such as EMC or DMC in the non-aqueous electrolyte, as done in the batteries 5A to 12A of Example 1, was effective to decrease the viscosity of the non-aqueous electrolyte so as to further improve the capacity maintenance rate under a low temperature condition.

It was found from the above results that: a non-aqueous electrolyte secondary battery, having excellent charge and discharge characteristics at a low temperature and showing satisfactory charge and discharge characteristics even after the battery is exposed to a high temperature over a period of time, can be realized, by using an electrolyte comprising a non-aqueous solvent and a solute dissolved in the non-aqueous solvent, wherein the non-aqueous solvent comprises a cyclic carboxylic acid ester (A), a cyclic carbonic acid ester having at least one carbon-carbon unsaturated bond (B) and a cyclic carbonic acid ester having no carbon-carbon unsaturated bond (C).

EXAMPLE 2

Because of extremely rapid polymerization reaction of vinylene carbonate (VC) on the negative electrode, addition of an excessive amount of VC possibly causes the formation of an excessive film, which deteriorates the low temperature characteristics. The content of VC in the non-aqueous solvent was therefore studied.

Batteries 1C to 7C were produced in the same manner as the battery 2A of Example 1, except that the content of VC in the non-aqueous solvent was varied as shown in Table 4. γ-butyrolactone (GBL) as the cyclic carboxylic acid ester (A), propylene carbonate (PC) as the cyclic carbonic acid ester having no carbon-carbon unsaturated bond (C) and $LiBF_4$ as the solute were used; the content of PC in the non-aqueous solvent was 1% by volume and the concentration of $LiBF_4$ in the non-aqueous electrolyte was 1.25 mol/l.

The capacity maintenance rates of the resultant batteries 1C to 7C under a low temperature condition were assessed in the same manner as above in Example 1. The results were shown in Table 5.

TABLE 4

| Battery | Cyclic carboxylic acid ester (A) | Cyclic carbonic acid ester (B) | Cyclic carbonic acid ester (C) | Linear carbonic acid ester (D) | Solute | Solute concentration (mol/l) |
|---|---|---|---|---|---|---|
| 1C | GBL 98.9 Vol % | VC 0.1 Vol % | PC 1 Vol % | — | $LiBF_4$ | 1.25 |
| 2C | GBL 98.5 Vol % | VC 0.5 Vol % | PC 1 Vol % | — | $LiBF_4$ | 1.25 |
| 3C | GBL 98 Vol % | VC 1 Vol % | PC 1 Vol % | — | $LiBF_4$ | 1.25 |
| 4C | GBL 94 Vol % | VC 5 Vol % | PC 1 Vol % | — | $LiBF_4$ | 1.25 |
| 5C | GBL 89 Vol % | VC 10 Vol % | PC 1 Vol % | — | $LiBF_4$ | 1.25 |
| 6C | GBL 79 Vol % | VC 20 Vol % | PC 1 Vol % | — | $LiBF_4$ | 1.25 |
| 7C | GBL 69 Vol % | VC 30 Vol % | PC 1 Vol % | — | $LiBF_4$ | 1.25 |

TABLE 5

| Battery | Capacity maintenance rate under a low temperature condition (%) |
|---|---|
| 1C | Unable to be charged and discharged |
| 2C | 61 |
| 3C | 71 |
| 4C | 72 |
| 5C | 65 |
| 6C | 60 |
| 7C | 42 |

As shown in Table 5, not enough film was formed to suppress the reductive decomposition of GBL when the content of VC in the non-aqueous solvent was 0.1% by volume, and the charge and discharge reaction did not proceed sufficiently even at an ordinary temperature. When the content of VC in the non-aqueous solvent was 30% by volume, on the other hand, a film was excessively formed on the negative electrode due to the reductive decomposition of VC, thereby decreasing the capacity maintenance rate at a low temperature. Accordingly, the appropriate content of VC is from not less than 0.5% to not more than 20% by volume in the non-aqueous solvent, and preferably from not less than 1% to not more than 10% by volume in the non-aqueous solvent, with which the batteries had satisfactory low temperature characteristics.

EXAMPLE 3

Next, the content of propylene carbonate (PC) or ethylene carbonate (EC) in the non-aqueous solvent was studied.

Batteries 1D to 18D were produced in the same manner as the battery 2A or 4A of Example 1, except that the content of PC or EC in the non-aqueous solvent was varied as shown in Table 6. γ-butyrolactone (GBL) as the cyclic carboxylic acid ester (A), vinylene carbonate (VC) as the cyclic carbonic acid ester having at least one carbon-carbon unsaturated bond (B) and $LiBF_4$ as the solute were used; the content of VC in the non-aqueous solvent was 2% by volume and the concentration of LiBF$_4$ in the non-aqueous electrolyte was 1.25 mol/l.

The capacity maintenance rates of the resultant batteries 1D to 18D under a low temperature condition and the capacity maintenance rates of the same after storage at a high temperature were assessed in the same manner as above in Example 1. The results were shown in Table 7.

decomposition of PC. Moreover, in the case of the content of EC being 50% by volume in the non-aqueous solvent, the low temperature characteristics were deteriorated considerably. This is presumably because the conductivity of the electrolyte at a low temperature decreased, and the capacity maintenance rate also dropped. It was found from these result that: relatively satisfactory characteristics are obtained when the content of PC or EC in the non-aqueous solvent is

TABLE 6

| Battery | Cyclic carboxylic acid ester (A) | Cyclic carbonic acid ester (B) | Cyclic carbonic acid ester (C) | Linear carbonic acid ester (D) | Solute | Solute concentration (mol/l) |
|---|---|---|---|---|---|---|
| 1D | GBL 97.9 Vol % | VC 2 vol % | PC 0.1 Vol % | — | LiBF$_4$ | 1.25 |
| 2D | GBL 97.5 Vol % | VC 2 vol % | PC 0.5 Vol % | — | LiBF$_4$ | 1.25 |
| 3D | GBL 97 Vol % | VC 2 vol % | PC 1 Vol % | — | LiBF$_4$ | 1.25 |
| 4D | GBL 93 Vol % | VC 2 vol % | PC 5 Vol % | — | LiBF$_4$ | 1.25 |
| 5D | GBL 88 Vol % | VC 2 vol % | PC 10 Vol % | — | LiBF$_4$ | 1.25 |
| 6D | GBL 78 Vol % | VC 2 vol % | PC 20 Vol % | — | LiBF$_4$ | 1.25 |
| 7D | GBL 68 Vol % | VC 2 vol % | PC 30 Vol % | — | LiBF$_4$ | 1.25 |
| 8D | GBL 58 Vol % | VC 2 vol % | PC 40 Vol % | — | LiBF$_4$ | 1.25 |
| 9D | GBL 48 Vol % | VC 2 vol % | PC 50 Vol % | — | LiBF$_4$ | 1.25 |
| 10D | GBL 97.9 Vol % | VC 2 vol % | EC 0.1 Vol % | — | LiBF$_4$ | 1.25 |
| 11D | GBL 97.5 Vol % | VC 2 vol % | EC 0.5 Vol % | — | LiBF$_4$ | 1.25 |
| 12D | GBL 97 Vol % | VC 2 vol % | EC 1 Vol % | — | LiBF$_4$ | 1.25 |
| 13D | GBL 93 Vol % | VC 2 vol % | EC 5 Vol % | — | LiBF$_4$ | 1.25 |
| 14D | GBL 88 Vol % | VC 2 vol % | EC 10 Vol % | — | LiBF$_4$ | 1.25 |
| 15D | GBL 78 Vol % | VC 2 vol % | EC 20 Vol % | — | LiBF$_4$ | 1.25 |
| 16D | GBL 68 Vol % | VC 2 vol % | EC 30 Vol % | — | LiBF$_4$ | 1.25 |
| 17D | GBL 58 Vol % | VC 2 vol % | EC 40 Vol % | — | LiBF$_4$ | 1.25 |
| 18D | GBL 48 Vol % | VC 2 vol % | EC 50 Vol % | — | LiBF$_4$ | 1.25 |

TABLE 7

| Battery | Capacity maintenance rate under a low temperature condition (%) | Capacity maintenance rate after storage at a high temperature (%) |
|---|---|---|
| 1D | 74 | 72 |
| 2D | 73 | 77 |
| 3D | 73 | 84 |
| 4D | 72 | 85 |
| 5D | 70 | 81 |
| 6D | 65 | 78 |
| 7D | 51 | 75 |
| 8D | 45 | 70 |
| 9D | 35 | 50 |
| 10D | 72 | 70 |
| 11D | 72 | 79 |
| 12D | 70 | 85 |
| 13D | 69 | 84 |
| 14D | 68 | 80 |
| 15D | 65 | 78 |
| 16D | 51 | 74 |
| 17D | 44 | 71 |
| 18D | 30 | 65 |

As shown in Table 7, relatively good capacity maintenance rates after storage at a high temperature were obtained even when the content of PC or EC in the non-aqueous solvent was 0.1% by volume. When the content of PC or EC in the non-aqueous solvent was 50% by volume, however, the capacity maintenance rate after storage at a high temperature decreased on a large scale. This is presumably because, as the amount of PC became relatively large compared to the amount of VC, VC insufficiently formed a film on the surface of the negative electrode, leading to the from not less than 0.1% to not more than 40% by volume; preferable content of PC or EC in the non-aqueous solvent is from not less than 0.1% to not more than 30% by volume, and particularly from not less than 0.1% to not more than 20% by volume.

EXAMPLE 4

Next, the content of the liner carbonic acid ester (D) in the non-aqueous solvent was studied.

Batteries 1E to 7E were produced in the same manner as in Example 1, except that the non-aqueous electrolytes, the compositions of which were shown in Table 8, were used. γ-butyrolactone (GBL) as the cyclic carboxylic acid ester (A), vinylene carbonate (VC) as the cyclic carbonic acid ester having at least one carbon-carbon unsaturated bond (B), ethylene carbonate (EC) as the cyclic carbonic acid ester having no carbon-carbon unsaturated bond (C), diethyl carbonate (DEC) as the linear carbonic acid ester (D) and LiBF$_4$ as the solute were used. The contents of VC and EC in the non-aqueous solvent were 2% and 20% by volume, respectively, the concentration of LiBF$_4$ in the non-aqueous electrolyte was 1 mol/l, and the content of DEC in the non-aqueous solvent was varied in the range of 1 to 60% by volume, whereas the content of GBL was varied along with the DEC content.

The capacity maintenance rates of the resultant batteries 1E to 7E under a low temperature condition and the capacity maintenance rates of the same after storage at a high temperature were assessed in the same manner as above in Example 1. The results were shown in Table 9.

TABLE 8

| Battery | Cyclic carboxylic acid ester (A) | Cyclic carbonic acid ester (B) | Cyclic carbonic acid ester (C) | Linear carbonic acid ester (D) | Solute | Solute concentration (mol/l) |
|---|---|---|---|---|---|---|
| 1E | GBL 18 Vol % | VC 2 vol % | EC 20 Vol % | DEC 60 Vol % | $LiBF_4$ | 1 |
| 2E | GBL 28 Vol % | VC 2 vol % | EC 20 Vol % | DEC 50 Vol % | $LiBF_4$ | 1 |
| 3E | GBL 48 Vol % | VC 2 vol % | EC 20 Vol % | DEC 30 Vol % | $LiBF_4$ | 1 |
| 4E | GBL 58 Vol % | VC 2 vol % | EC 20 Vol % | DEC 20 Vol % | $LiBF_4$ | 1 |
| 5E | GBL 68 Vol % | VC 2 vol % | EC 20 Vol % | DEC 10 Vol % | $LiBF_4$ | 1 |
| 6E | GBL 73 Vol % | VC 2 vol % | EC 20 Vol % | DEC 5 Vol % | $LiBF_4$ | 1 |
| 7E | GBL 77 Vol % | VC 2 vol % | EC 20 Vol % | DEC 1 Vol % | $LiBF_4$ | 1 |

TABLE 9

| Battery | Capacity maintenance rate under a low temperature condition (%) | Capacity maintenance rate after storage at a high temperature (%) |
|---|---|---|
| 1E | 60 | 68 |
| 2E | 63 | 77 |
| 3E | 65 | 85 |
| 4E | 72 | 83 |
| 5E | 71 | 81 |
| 6E | 70 | 80 |
| 7E | 67 | 79 |

In Table 9, there seen a tendency that when the content of DEC in the non-aqueous solvent was from not less than 1% to not more than 20% by volume, both the capacity maintenance rate at a low temperature and the capacity maintenance rate after storage at a high temperature rose as the content of DEC increased and the content of GBL decreased. When the content of DEC was from not less than 30% to not more than 60%, however, the capacity maintenance rate at a low temperature dropped.

When the content of DEC in the non-aqueous solvent was from not less than 1% to not more than 30% by volume, the capacity maintenance rate after storage at a high temperature tended to rise as the content of DEC increased and the content of GBL decreased. When the content of DEC in the non-aqueous solvent was from not less than 50% to not more than 60% by volume, however, the capacity maintenance rate after storage at a high temperature tended to drop as the content of DEC increased and the content of GBL decreased. This is presumably because excessive containment of DEC in the non-aqueous electrolyte caused some sort of side effect when the battery was stored to deteriorate the battery characteristics. It is to be noted that when the content of DEC in the non-aqueous solvent was less than 0.1% by volume, there was almost no improvement observed in the battery characteristics. Hence, the content of DEC in the non-aqueous solvent is preferably 50% by volume or less, more preferably from not less than 0.1% to not more than 30% by volume, and most preferably from not less than 0.1% to not more than 20% by volume.

EXAMPLE 5

Subsequently, the case of using $LiPF_6$ and $LiBF_4$ together as the solute of the non-aqueous electrolyte was studied.

As shown in Table 10, γ-butyrolactone (GBL), vinylene carbonate (VC), ethylene carbonate (EC) and diethyl carbonate (DEC) were mixed at a volume ratio of 68:2:20:10 to be used as the non-aqueous solvent. The mole ratio of $LiPF_6$ and $LiBF_4$ was varied such that the total concentration of $LiPF_6$ and $LiBF_4$ in the electrolyte was to be 1 mol/l. Except that, batteries 1F to 5F were produced in the same manner as in Example 1. Here, it is noted that: the battery 5F was identical to the battery 5E of Example 4.

TABLE 10

| Battery | Cyclic carboxylic acid ester (A) | Cyclic carbonic acid ester (B) | Cyclic carbonic acid ester (C) | Linear carbonic acid ester (D) | Solute and Solute concentration (mol/l) |
|---|---|---|---|---|---|
| 1F | GBL 68 Vol % | VC 2 vol % | EC 20 Vol % | DEC 10 Vol % | $LiPF_6$ 1 mol/l |
| 2F | GBL 68 Vol % | VC 2 vol % | EC 20 Vol % | DEC 10 Vol % | $LiPF_6$ 0.9 mol/l + $LiBF_4$ 0.1 mol/l |
| 3F | GBL 68 Vol % | VC 2 vol % | EC 20 Vol % | DEC 10 Vol % | $LiPF_6$ 0.5 mol/l + $LiBF_4$ 0.5 mol/l |
| 4F | GBL 68 Vol % | VC 2 vol % | EC 20 Vol % | DEC 10 Vol % | $LiPF_6$ 0.1 mol/l + $LiBF_4$ 0.9 mol/l |
| 5F(5E) | GBL 68 Vol % | VC 2 vol % | EC 20 Vol % | DEC 10 Vol % | $LiBF_4$ 1 mol/l |

Evaluation of Batteries Part 2

The following were characteristics of the resultant batteries 1F to 5F measured here. The results were shown in Table 11.

(i) Capacity Maintenance Rate of the Batteries After Storage at a High Temperature:

The capacity maintenance rates of the batteries after storage at a high temperature were measured in the same manner as in Example 1

(ii) Cycle Life:

The charge and discharge cycle of the batteries was repeated and a cycle number, at which 50% of the capacity at the third cycle was measured, was taken as a cycle life.

The batteries were charged at a constant current and voltage in the condition that a fixed ambient temperature was 20° C., a fixed ceiling voltage was 4.2 V, a maximum current was 1050 mA and the charging lasted 2.5 hours. The batteries thus charged were discharged at a discharge current of 1500 mA at an ambient temperature of 20° C. until the voltage reached 3.0 V.

(iii) Amount of Gas Generated After the Cycles:

The amount of gas generated in the batteries having reached the cycle life thereof in Evaluation (ii) above.

TABLE 11

| Battery | Capacity maintenance rate after storage at a high temperature (%) | Cycle life | Gas amount after cycles (ml) |
|---|---|---|---|
| 1F | 84 | 300 | 2.3 |
| 2F | 84 | 580 | 2.0 |
| 3F | 83 | 750 | 2.2 |
| 4F | 82 | 450 | 2.5 |
| 5F | 81 | 500 | 3.0 |

As shown in Table 11, the higher the mixing ratio of $LiPF_6$, the higher the capacity maintenance rate after storage at a high temperature. The longest cycle life was observed when the mixing ratio of $LiPF_6$ and $LiBF_4$ was 1:1. The amount of gas generated after the cycles was smallest when the mixing ratio of $LiPF_6$ and $LiBF_4$ was 9:1.

EXAMPLE 6

Next, the case of using a non-aqueous electrolyte containing vinylene carbonate (VC) alone and the case of using a non-aqueous electrolyte containing VC and vinylethylene carbonate (VEC) as the cyclic carbonic acid ester having at least one carbon-carbon unsaturated bond (B), were studied.

Herein the non-aqueous electrolytes, the compositions of which were shown in Table 12, were used. As the non-aqueous solvents, one obtained by mixing γ-butyrolactone (GBL), VC, ethylene carbonate (EC) and diethyl carbonate (DEC) at a volume ratio of 68:2:20:10 and the other obtained by mixing GBL, (VC+VEC), EC and DEC at a volume ratio of 67:(2+1):20:10 were used. $LiBF_4$ was used as the solute and the concentration of $LiBF_4$ in the electrolyte was 1 mol/l. Except that, batteries 1G to 2G were produced in the same manner as in Example 1. Here, it is noted that: the battery 2G was identical to the battery 5E of Example 4.

TABLE 13

| Battery | Gas amount after cycles (ml) |
|---|---|
| 1G | 1.9 |
| 2G | 3.0 |

As shown in Table 13, the amount of gas generated was 3.0 ml when VEC was not contained in the non-aqueous electrolyte, while the amount of gas generated was 1.9 ml when VEC was contained in the non-aqueous electrolyte. It is found, therefrom, that using VC and VEC together is effective for reducing the amount of gas generated after the cycles.

EXAMPLE 7

Next, the effectiveness in the case of using a non-aqueous electrolyte containing cyclohexylbenzene (CHB), biphenyl (BP) or diphenyl eter (DPE) as an additive against the overcharging was studied.

Herein the non-aqueous electrolytes, the compositions of which were shown in Table 14, were used. As the non-aqueous solvents, one obtained by mixing γ-butyrolactone (GBL), vinylene carbonate (VC), ethylene carbonate (EC), diethyl carbonate (DEC), and either of CHB, BP and DPE at a volume ratio of 65:2:20:10:3 and the other obtained by mixing GBL, VC, EC and DEC at a volume ratio of 68:2:20:10 were used. $LiBF_4$ was used as the solute and the concentration of $LiBF_4$ in the electrolyte was 1 mol/l. Except

TABLE 12

| Battery | Cyclic carboxylic acid ester (A) | Cyclic carbonic acid ester (B) | Cyclic carbonic acid ester (C) | Linear carbonic acid ester (D) | Solute | Solute concentration (mol/l) |
|---|---|---|---|---|---|---|
| 1G | GBL 67 Vol % | VC 2 vol % + VEC 1 Vol % | EC 20 Vol % | DEC 10 Vol % | $LiBF_4$ | 1 |
| 2G(5E) | GBL 68 Vol % | VC 2 vol % | EC 20 Vol % | DEC 10 Vol % | $LiBF_4$ | 1 |

The amount of gas generated in the resultant batteries 1G and 2G after the cycles were measured in the same manner as in Example 5. The results were shown in Table 13.

that, batteries 1H to 4H were produced in the same manner as in Example 1. Here, it is noted that: the battery 4H was identical to the battery 5E of Example 4.

TABLE 14

| Battery | Cyclic carboxylic acid ester (A) | Cyclic carbonic acid ester (B) | Cyclic carbonic acid ester (C) | Linear carbonic acid ester (D) | Benzene delivative | Solute | Solute concentration (mol/l) |
|---|---|---|---|---|---|---|---|
| 1H | GBL 65 Vol % | VC 2 vol % | EC 20 Vol % | DEC 10 Vol % | CHB 3 Vol % | $LiBF_4$ | 1 |
| 2H | GBL 65 Vol % | VC 2 vol % | EC 20 Vol % | DEC 10 Vol % | BP 3 Vol % | $LiBF_4$ | 1 |
| 3H | GBL 65 Vol % | VC 2 vol % | EC 20 Vol % | DEC 10 Vol % | DPE 3 Vol % | $LiBF_4$ | 1 |
| 4H(5E) | GBL 68 Vol % | VC 2 vol % | EC 20 Vol % | DEC 10 Vol % | — | $LiBF_4$ | 1 |

Evaluation of Batteries Part 3

The following were characteristics of the resultant batteries 1H to 4H measured here.

(i) Shutdown Temperature:

After the charge and discharge cycle was repeated three times, the batteries were overcharged at a current of 1500 mA to measure a temperature of the battery surface at which a shutdown (a phenomenon that a separator was clogged to shut down a current flow) occurred.

It is to be noted that in the charge and discharge cycle the batteries were charged at a constant current and voltage in the condition that a fixed ambient temperature was 20° C., fixed ceiling voltage was 4.2 V, a maximum current was 1050 mA and the charging lasted 2.5 hours. The batteries thus charged were discharged at a discharge current of 1500 mA at an ambient temperature of 20° C. until the voltage reached 3.0 V. The results were shown in Table 15.

TABLE 15

| Battery | Shutdown temperature (° C.) |
|---|---|
| 1H | 70 |
| 2H | 71 |
| 3H | 73 |
| 4H (5E) | 80 |

As shown in Table 15, the temperature at which the shutdown occurred was 80° C. when the additive against the overcharging was not contained in the non-aqueous electrolyte, while that was 70° C. when CHB was contained in the non-aqueous electrolyte, that was 71° C. when BP was contained in the non-aqueous electrolyte and that was 73° C. when DPE was contained in the non-aqueous electrolyte. It was found, therefrom, that containment of CHB, BP or DPE in the non-aqueous electrolyte allows obtainment of safer battery characteristics.

EXAMPLE 8

Then, five types of batteries comprising as the positive electrode active material thereof $Li_1Co_{0.95}Mg_{0.05}O_2$, $Li_1Co_{0.90}Ni_{0.05}Mg_{0.05}O_2$, $Li_1Co_{0.90}Al_{0.05}Mg_{0.05}O_2$, $Li_1Co_{0.90}Mn_{0.50}Mg_{0.05}O_2$ and $LiCoO_2$, respectively, were produced, and the characteristics thereof were compared.

The following method was used to synthesize $Li_1Co_{0.95}Mg_{0.05}O_2$:

An aqueous solution containing 0.95 mol/l of cobalt sulfate and 0.05 mol/l of magnesium sulfate was successively provided to a reaction vessel into which sodium hydroxide was then dropped such that pH of water was from 10 to 13, to synthesize a precursor of the active material. This resulted in the obtainment of a hydroxide composed of $Co_{0.95}Mg_{0.05}(OH)_2$.

The obtained precursor and lithium carbonate were mixed such that the molar ratio of lithium, cobalt and magnesium was 1:0.95:0.05, and the mixture was temporarily calcinated at 600° C. for 10 hours and pulverized. The pulverized calcinated matter was again calcinated at 900° C. for another 10 hours, which was pulverized and then sieved to give the positive electrode active material represented by the chemical formula $Li_1Co_{0.95}Mg_{0.05}O_2$. Batteries 1I and 2I were produced in the same manner as in Example 1, except that the obtained $Li_1Co_{0.95}Mg_{0.05}O_2$ was used as the positive electrode active material.

$Li_1Co_{0.90}Ni_{0.05}O_2$ was prepared in the same manner as $Li_{Co0.95}Mg_{0.05}O_2$, except that a hydroxide composed of $Co_{0.90}Mg_{0.05}Ni_{0.05}(OH)_2$ was synthesized as the precursor, which was mixed with lithium carbonate such that the molar ratio of lithium, cobalt, magnesium and nickel was 1:0.90:0.05:0.05. Batteries 3I and 4I were produced in the same manner as in Example 1, except that the obtained $Li_1Co_{0.90}Ni_{0.95}O_2$ was used as the positive electrode active material.

$LiCo_{0.90}Al_{0.05}Mg_{0.05}O_2$ was prepared in the same manner as $Li_1Co_{0.95}Mg_{0.05}O_2$, except that a hydroxide composed of $Co_{0.90}Mg_{0.05}Al_{0.05}(OH)_2$ was synthesized as the precursor, which was mixed with lithium carbonate such that the molar ratio of lithium, cobalt, magnesium and aluminum was 1:0.90:0.05:0.05. Batteries 5I and 6I were produced in the same manner as in Example 1, except that the obtained $Li_1Co_{0.90}Al_{0.05}O_2$ was used as the positive electrode active material.

$Li_1Co_{0.90}Mn_{0.05}Mg_{0.05}O_2$ was prepared in the same manner as $Li_1Co_{0.95}Mg_{0.05}O_2$, except that a hydroxide composed of $Co_{0.90}Mg_{0.05}Mn_{0.05}(OH)_2$ was synthesized as the precursor, which was mixed with lithium carbonate such that the molar ratio of lithium, cobalt, magnesium and manganese was 1:0.90:0.05:0.05. Batteries 7I and 8I were produced in the same manner as in Example 1, except that the obtained $Li_1Co_{0.90}Mn_{0.05}Mg_{0.05}O_2$ was used as the positive electrode active material.

Likewise, batteries 9I and 10I were produced using $LiCoO_2$.

Herein the non-aqueous electrolytes, the compositions of which were shown in Table 16, were used. As the non-aqueous solvent, one obtained by mixing γ-butyrolactone (GBL), vinylene carbonate (VC), ethylene carbonate (EC) and diethyl carbonate (DEC) at a volume ratio of 68:2:20:10 and the other obtained by mixing EC and DEC at a volume ratio of 25:75 were used. $LiBF_4$ was used as the solute and the concentration of $LiBF_4$ in the electrolyte was 1 mol/l.

TABLE 16

| Battery | Cyclic carboxylic acid ester (A) | Cyclic carbonic acid ester (B) | Cyclic carbonic acid ester (C) | Linear carbonic acid ester (D) | Additional element | Solute | Solute concentration (mol/l) |
|---|---|---|---|---|---|---|---|
| 1I | GBL 68 Vol % | VC 2 vol % | EC 20 Vol % | DEC 10 Vol % | Mg | LiBF$_4$ | 1 |
| 2I | — | — | EC 25 Vol % | DEC 75 Vol % | Mg | LiBF$_4$ | 1 |
| 3I | GBL 68 Vol % | VC 2 vol % | EC 20 Vol % | DEC 10 Vol % | Ni, Mg | LiBF$_4$ | 1 |
| 4I | — | — | EC 25 Vol % | DEC 75 Vol % | Ni, Mg | LiBF$_4$ | 1 |
| 5I | GBL 68 Vol % | VC 2 vol % | EC 20 Vol % | DEC 10 Vol % | Al, Mg | LiBF$_4$ | 1 |
| 6I | — | — | EC 25 Vol % | DEC 75 Vol % | Al, Mg | LiBF$_4$ | 1 |
| 7I | GBL 68 Vol % | VC 2 vol % | EC 20 Vol % | DEC 10 Vol % | Mn, Mg | LiBF$_4$ | 1 |
| 8I | — | — | EC 25 Vol % | DEC 75 Vol % | Mn, Mg | LiBF$_4$ | 1 |
| 9I(5E) | GBL 68 Vol % | VC 2 vol % | EC 20 Vol % | DEC 10 Vol % | — | LiBF$_4$ | 1 |
| 10I | — | — | EC 25 Vol % | DEC 75 Vol % | — | LiBF$_4$ | 1 |

The capacity maintenance rates of the resultant batteries 1I to 10I (the battery 9I was identical to the battery 5E of Example 4) under a low temperature condition were assessed in the same manner as Evaluation(ii) of Example 1, and the cycle life of each battery was assessed in the same manner as Evaluation(ii) of Example 5.

TABLE 17

| Battery | Capacity maintenance rate under a low temperature condition (%) | Cycle life |
|---|---|---|
| 1I | 81 | 630 |
| 2I | 48 | 480 |
| 3I | 80 | 650 |
| 4I | 47 | 505 |
| 5I | 82 | 640 |
| 6I | 49 | 495 |
| 7I | 83 | 635 |
| 8I | 50 | 485 |
| 9I | 71 | 500 |
| 10I | 33 | 450 |

As seen from Table 17, the discharge characteristics under a low temperature condition in the cases of using the active material containing Mg or the like for the positive electrode were superior to those in the cases of using $LiCoO_2$ for the positive electrode. And in any positive electrode, the cycle life of a battery in the case of using the mixture of GBL, VC, EC and DEC for the electrolyte was superior to that in the case of using the mixture of EC and DEC for the electrolyte.

EXAMPLE 9

Next, the case where a non-aqueous electrolyte comprises a glime was studied.

Herein the non-aqueous electrolytes, the compositions of which were shown in Table 18, were used. As the non-aqueous electrolytes, one obtained by mixing γ-butyrolactone (GBL), VC, ethylene carbonate (EC) and the glime at a volume ratio of 68:2:20:10 and the other obtained by mixing GBL, VC and EC at a volume ratio of 78:2:20 were used. $LiBF_4$ was used as the solute and the concentration of $LiBF_4$ in the electrolyte was 1 mol/l. Diglime, triglime or tetraglime was used as the glime. Except that, batteries 1J to 4J were produced in the same manner as in Example 1.

The capacity maintenance rates of the resultant batteries 1J to 4J after storage at a high temperature were measured in the same manner as Example 1. The results were shown in Table 19.

TABLE 19

| Battery | Capacity maintenance rate after storage at a high temperature (%) |
|---|---|
| 1J | 80 |
| 2J | 81 |

TABLE 19-continued

| Battery | Capacity maintenance rate after storage at a high temperature (%) |
|---|---|
| 3J | 83 |
| 4J | 76 |

As shown in Table 19, in the case that the non-aqueous electrolyte comprises no glime, the capacity maintenance rate after storage of the battery is 76%. On the other hand, in the case that the non-aqueous electrolyte comprises diglime, the capacity maintenance rate after storage of the battery is 80%; in the case that the non-aqueous electrolyte comprises triglime, the capacity maintenance rate after storage of the battery is 81%; and in the case that the non-aqueous electrolyte comprises tetraglime, the capacity maintenance rate after storage of the battery is 83%, all indicating the improved characteristics.

It should be noted that while in the present examples only a part of compounds were described in terms of cyclic carboxylic acid esters (A), cyclic carbonic acid esters having at least one carbon-carbon unsaturated bond (B), and cyclic carbonic acid esters having no carbon-carbon unsaturated bond (C), other compounds than what were described have had similar effects, and therefore, the present invention is not limited to the examples thus described.

In the present invention, as above described, the use of a non-aqueous electrolyte comprising a non-aqueous solvent and a solute dissolved therein, wherein the non-aqueous electrolyte comprises the cyclic carboxylic acid ester (A), the cyclic carbonic acid ester having at least one carbon-carbon unsaturated bond (B), the cyclic carbonic acid ester having no carbon-carbon unsaturated bond (C) allows: the cyclic carbonic acid ester (B) to suppress the reductive decomposition of the cyclic carboxylic acid ester (A) by forming a close and strong film on the negative electrode; and the cyclic carbonic acid ester (C) to suppress the excessive formation of a film by the cyclic carbonic acid ester (B) even when the battery is exposed to a high temperature over a period of time. As a result, a non-aqueous electrolyte secondary battery, having excellent charge and discharge characteristics at a low temperature and showing

TABLE 18

| Battery | Cyclic carboxylic acid ester (A) | Cyclic carbonic acid ester (B) | Cyclic carbonic acid ester (C) | Linear carbonic acid ester (D) | Glime (E) | Solute | Solute concentration (mol/l) |
|---|---|---|---|---|---|---|---|
| 1J | GBL 68 Vol % | VC 2 vol % | EC 20 Vol % | — | Diglime 10 Vol % | $LiBF_4$ | 1 |
| 2J | GBL 68 Vol % | VC 2 vol % | EC 20 Vol % | — | Triglime 10 Vol % | $LiBF_4$ | 1 |
| 3J | GBL 68 Vol % | VC 2 vol % | EC 20 Vol % | — | Tetraglime 10 Vol % | $LiBF_4$ | 1 |
| 4J | GBL 78 Vol % | VC 2 vol % | EC 20 Vol % | — | — | $LiBF_4$ | 1 | satisfactory charge and discharge characteristics even after the battery is stood still under a high temperature condition over a period of time, can be realized.

Although the present invention has been described in terms of the presently preferred embodiments, it is to be understood that such disclosure is not to be interpreted as limiting. Various alternations and modifications will no doubt become apparent to those skilled in the art to which the present invention pertains, after having read the above disclosure. Accordingly, it is intended that the appended claims be interpreted as covering all alternations and modifications as fall within the true spirit and scope of the invention.

What is claimed is:

1. A non-aqueous electrolyte secondary battery comprising a positive electrode, a negative electrode and a non-aqueous electrolyte,
wherein said non-aqueous electrolyte comprises a non-aqueous solvent and a solute dissolved in said non-aqueous solvent,
wherein said non-aqueous solvent comprises: (A) a cyclic carboxylic acid ester; (B) 0.5 to 20 volume percent of the total volume of non-aqueous solvent of a cyclic carbonic acid ester having at least one carbon-carbon unsaturated bond; and (C) a cyclic carbonic acid ester having no carbon-carbon unsaturated bond,
and wherein said cyclic carbonic acid ester having at least one carbon-carbon unsaturated bond (B) comprises vinylethylene carbonate and vinylene carbonate.

2. The non-aqueous electrolyte secondary battery in accordance with claim 1, wherein said cyclic carboxylic acid ester (A) is at least one selected from the group consisting of γ-butyrolactone and a derivative of γ-butyrolactone represented by the formula (1):

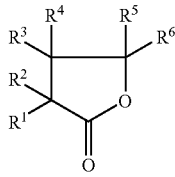

where $R^1$ to $R^6$ are, independently, a hydrogen atom, a halogen atom, an alkyl group having 1 to 6 carbon atoms, or an acetyl group having 1 to 6 carbon atoms.

3. The non-aqueous electrolyte secondary battery in accordance with claim 2, wherein said derivative of γ-butyrolactone is γ-valerolactone.

4. The non-aqueous electrolyte secondary battery in accordance with claim 1, wherein said cyclic carbonic acid ester having at least one carbon-carbon unsaturated bond (B) further comprises divinylethylene carbonate.

5. The non-aqueous electrolyte secondary battery in accordance with claim 1, wherein said cyclic carbonic acid ester having no carbon-carbon unsaturated bond (C) is at least one selected from the group consisting of propylene carbonate, ethylene carbonate and butylene carbonate.

6. The non-aqueous electrolyte secondary battery in accordance with claim 1, wherein said cyclic carboxylic acid ester (A) is at least one selected from the group consisting of γ-butyrolactone and γ-valerolactone, said cyclic carbonic acid ester having at least one carbon-carbon unsaturated bond (B) further comprises divinylethylene carbonate, and said cyclic carbonic acid ester having no carbon-carbon unsaturated bond (C) is at least one selected from the group consisting of propylene carbonate and ethylene carbonate.

7. The non-aqueous electrolyte secondary battery in accordance with claim 1, wherein said non-aqueous solvent further comprises a linear carbonic acid ester (D).

8. The non-aqueous electrolyte secondary battery in accordance with claim 7, wherein said linear carbonic acid ester (D) is at least one selected from the group consisting of dimethyl carbonate, ethylmethyl carbonate and diethyl carbonate.

9. The non-aqueous electrolyte secondary battery in accordance with claim 1, wherein said non-aqueous solvent further comprises a glime (E).

10. The non-aqueous electrolyte secondary battery in accordance with claim 9, wherein said glime (E) is at least one selected from the group consisting of diglime, triglime and tetraglime.

11. The non-aqueous electrolyte secondary battery in accordance with claim 1, wherein said positive electrode comprises a lithium-containing transition metal oxide and said negative electrode comprises graphite.

12. The non-aqueous electrolyte secondary battery in accordance with claim 11, wherein said lithium-containing transition metal oxide is represented by the formula:

$$Li_a(CO_{1-x-y}Mg_xM_y)_bO_c$$

where M is at least one selected from the group consisting of Mn, Ni, Y, Yb, Ca, Al, Ti, Cu, Zn, Sr and Ba, $0 \leq a \leq 1.05$, $0.005 \leq x \leq 0.15$, $0 \leq y \leq 0.25$, $0.85 \leq b \leq 1.1$ and $1.8 \leq c \leq 2.1$.

13. The non-aqueous electrolyte secondary battery in accordance with claim 1, wherein said non-aqueous electrolyte comprises $LiPF_6$ and $LiBF_4$ in a molar ratio of 1:9 to 9:1 as said solute.

14. The non-aqueous electrolyte secondary battery in accordance with claim 1, wherein said non-aqueous solvent further comprises a derivative of benzene comprising a phenyl group and a cyclic compound group contiguous to said phenyl group.

* * * * *